United States Patent [19]

Lange et al.

[11] Patent Number: 4,555,806

[45] Date of Patent: Nov. 26, 1985

[54] SYSTEM FOR THE AUTOMATIC ESTABLISHMENT OF A SHORTWAVE TELEGRAPHY SIGNAL CONNECTION

[75] Inventors: Wolf-Ruediger Lange, Dachau; Anton Wessel; Udo Böhler, both of Munich; Klaus Volkheimer, Grafing; Günter Greiner; Peter Islet, both of Munich, all of Fed. Rep. of Germany

[73] Assignee: Rohde & Schwarz GmbH & Co. KG, Munich, Fed. Rep. of Germany

[21] Appl. No.: 479,771

[22] Filed: Mar. 28, 1983

[30] Foreign Application Priority Data

Mar. 27, 1982 [DE] Fed. Rep. of Germany ....... 3211325

[51] Int. Cl.[4] ............................................ H04B 17/00
[52] U.S. Cl. .......................................... 455/62; 455/67
[58] Field of Search ................. 455/62, 52, 65, 32, 455/67

[56] References Cited

U.S. PATENT DOCUMENTS

| 4,197,500 | 4/1980 | Klein et al. ............... 455/62 |
| 4,309,773 | 1/1982 | Johnson et al. ........... 455/67 |
| 4,328,581 | 5/1982 | Harmon et al. ........... 455/62 |

FOREIGN PATENT DOCUMENTS

| 2039409 | 2/1972 | Fed. Rep. of Germany . |
| 2042133 | 3/1972 | Fed. Rep. of Germany . |
| 2408587 | 9/1974 | Fed. Rep. of Germany . |
| 2402562 | 7/1975 | Fed. Rep. of Germany . |
| 2537683 | 3/1977 | Fed. Rep. of Germany . |
| 2659635 | 7/1978 | Fed. Rep. of Germany . |
| 2650823 | 11/1978 | Fed. Rep. of Germany . |
| 1328595 | 8/1973 | United Kingdom . |
| 1328594 | 8/1973 | United Kingdom . |

OTHER PUBLICATIONS

"Assessing HF Propagation Conditions in Real Time", Defense Electronics Review, May 1980, pp. 21-22.
"Soft-Decision Error Control for H.F. Data Transmission", IEE Proceedings, vol. 127, Pt. F, No. 5, Oct. 1980, pp. 389 & fol.

Primary Examiner—Marc E. Bookbinder
Attorney, Agent, or Firm—Willian Brinks Olds Hofer Gilson & Lione Ltd.

[57] ABSTRACT

A system for the automatic establishment of a shortwave telegraphy signal connection between two transmitter-receiver stations within a frequency range subdivided into several channels. Both stations use their receiver to determine objective measurement values reflecting the transmission conditions over the individual channels. Active and passive channel analysis of the actual quality of the signal transmission is determined at each channel. The transmitter of the calling station is automatically tuned to the channel which corresponds to the best channel quality stored in its memory. A predetermined time after transmitting the call signal, the calling station switches to reception and upon reception of an acknowledgment signal from the counter station automatically begins the message transmitting-and-receiving operation. If after a predetermined time no acknowledgment signal is received, the transmitter automatically switches to the channel stored in its memory with the next best channel quality value.

34 Claims, 2 Drawing Figures

STATION 1 AND STATION 2

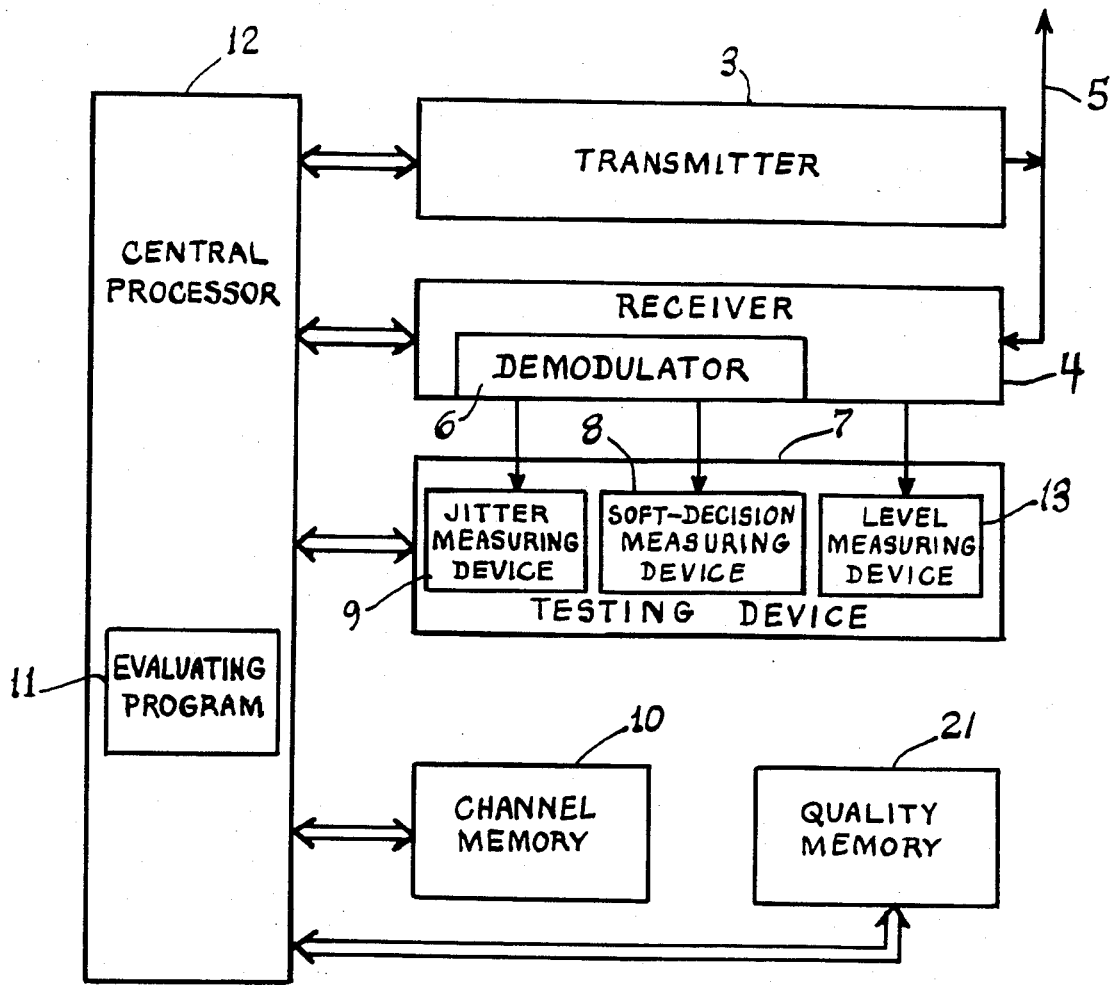
FIG. 1: STATION 1 AND STATION 2
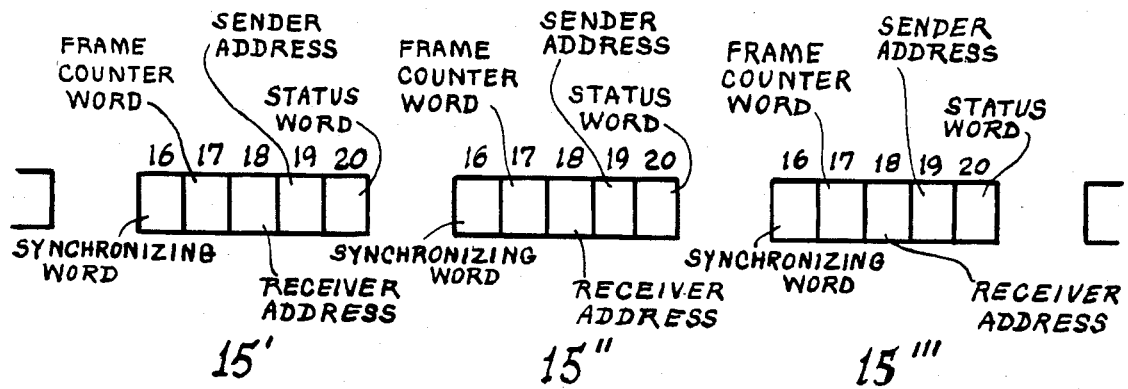
FIG. 2: CALL SIGNAL

SYSTEM FOR THE AUTOMATIC ESTABLISHMENT OF A SHORTWAVE TELEGRAPHY SIGNAL CONNECTION

BACKGROUND OF THE INVENTION

This invention relates to a system for the establishment of a short wave signal connection between two transmitter-receiver stations within a frequency band subdivided into several channels. For the establishment of a two-way short wave connection between two transmitter-receiver stations, various transmission criteria must be taken into account including, for example, the changing transmission properties of the ionosphere which depend upon the time of day or sun spot activity, fading effects, interferences from other transmitters, etc. In normal radio telephony communication or telegraphy sign communication, all these criteria are taken into account by a specially trained signal operator. This person selects the most favorable transmission channels on the basis of his experience.

In order to facilitate this connection establishment by an experienced operator, a relatively expensive system described in "Assessing HF Propagation Conditions in Real Time," Defense Electronics Review, May 1980, pages 21-22 may be added to the transmitter-receiver units at the two stations. This system determines which of the channels is free and undisturbed by neighboring transmitters and continuously monitors the propagation conditions over the ionosphere. A spectrum monitor is used in this system to search through the entire HF spectrum every 10 seconds. It thus performs a passive channel analysis to check which channels in the frequency band are free and which are affected by interference sources. The results of the passive channel analysis are presented graphically on the CRT display of the system. Simultaneously, an auxiliary test transmitter sweeps through the HF bands as often as every five minutes. A test receiver at the counter station cooperates with the test transmitter by searching through the entire frequency band to ascertain at any moment the propagation conditions over the ionosphere at individual frequencies over the total frequency band. The frequency at which a transmission will obtain the highest possible level of reception is thus determinable. The results of this active channel analysis is displayed on another CRT. The operator can select clear channels from the passive analysis display and ascertain from the active analysis display which free channel has the best reception level. He can determine the best channel for his use and establish the desired message connection. This system is relatively complicated and expensive. In addition to the apparatus for message transmission, it also requires the accessory devices for active and passive channel analysis. It is also necessary in this system that the decision of which channels to use is determined by the operator through evaluating the CRT displays. This system does not provide an automatic establishment of short wave connections.

Even if the known system described above automatically linked the active and passive channel analysis to a suitable microprocessor and from this automatically determined the actual transmission properties of the individual channels, an automatic connection establishment would still not be possible. The known system only analyzes the high frequency transmission properties. These do not supply an objective measure of the actual channel quality. Thus, there is a need for an automatically operated system for the establishment of short wave message connections such as is known in the UHF range.

In the UHF frequency range, the transmission criteria which are analyzed for short wave transmissions do not play any part. All channels are insured of equally good transmission conditions. Thus, it is a conventional practice to program the transmitters of the two stations on predetermined free channels. The transmitter is first tuned to one of the selected channels. The receiver at the receiving station constantly searches and synchronizes itself automatically to the frequency selected by the transmitter. At the end of the call signal first emitted by the transmitter, the receiver at the receiving station switches its transmitter automatically to this channel and transmits to the caller a corresponding acknowledgment signal. It is then possible to perform the message transmitting-and-receiving operation. This automatic synchronization between a receiver and transmitter can be repeated each time the channel being transmitted is changed. Because of the special transmission criteria which must be taken into account in the short wave range, this process for automatic establishment of a connection in the UHF range is not suitable for short wave connections. It is an object of the invention, therefore, to provide a system in which the establishment of short wave telegraphy sign connections between two transmitter-receiver stations is fully automatic.

SUMMARY OF THE INVENTION

The present invention is characterized by a testing device which provides an objective measurement value of the quality of signal transmission over a channel through the use of one or more tests. The objective measurement values for each channel thereby determined are sorted and stored in a table in a memory according to their quality. The transmitter can then be immediately tuned to the best channel for the start of a message transmission. The transmitter at the calling station is automatically tuned first to the channel which is stored in the memory having the best transmission quality values. The automatic synchronization of the receiver at the receiving station with the call signal of the transmitter and the emission from the receiver at the receiving station of an acknowledgement signal can then be carried out fully automatically in a known manner. A predetermined time after sending the call signal, the calling station automatically switches to reception and upon reception of an acknowledgment signal from the receiving station, the message transmitting-and-receiving operation is automatically begun. If after waiting a second predetermined time, no acknowledgment signal is received, the transmitter at the calling station is automatically switched to the channel stored in the memory having the next best channel quality value. This process continues until a connection is made.

In this system of the present invention, the actual quality of the signal transmission is determined through an analysis of the demodulated received signal. Thereby, the actual quality with which a signal can be received when transmitted over a certain channel is obtained. The knowledge of this actual transmission quality enables the provision of the fully automatic connection establishment. This provides the greatest probability for most rapidly making a possible connection at the best channel.

According to the present invention, additional transmitters or receivers are not necessary. The system only requires the use of the transmitters and receivers which are needed in any case for the establishment of a message connection. Thus, the total expense of the system is reduced. All that is needed is a few additional control devices.

The determination of the actual quality of the signal transmissions can be carried out in various ways. The quality determination can be carried out either before the demodulation or after the demodulation. It has proved to be especially advantageous in making the quality determination to evaluate the soft decision information, the reception signal strength and the jitter. The reception signal strength can be determined in a known manner. Soft decision decoding is described in "Soft Decision Error Control for h.f. Data Transmission" IEE Proceedings, Vol. 127, Pt., F, No. 5, October 1980. In soft decision decoding, each bit in the transmitted signal is examined for whether it is above or below the decision threshold as in hard decision decoding, however, there is also a qualitative determination of the confidence value of each bit. Another test for determining the quality of the signal lies in determining in a known manner the jitter of the received signal.

In the passive channel analysis of the present invention, not only is it determined whether the channel is occupied or free, but accidentally present and received telegraphy signals which can come from other transmitters are examined in each channel. The evaluation can be done using soft decision decoding or jitter analysis or both simultaneously. This allows an objective measurement value to be produced for each channel by a passive channel analysis, making possible a fully automatic establishment of a connection.

The call signals sent out by the transmitters are preferably coded in such a way that when the receiver decodes the signal it can directly derive from the call signal when the call signal is finished. Therefore, the receiving station can be switched over from reception to transmission of the acknowledgment signal at the appropriate time. This is important when, for example, the call signal is only poorly received or when the end of the call signal is not received. The receiver can automatically determine from the received call signal the actual point in time at which the acknowledgment signal should be emitted so that it will coincide with the time when the receiver at the calling station is switched for reception. There are many possibilities for the coding of the call signal. An especially simple and advantageous possibility is to subdivide the call signal into individual frame sections. Each frame would be transmitted in a constantly repeating pattern of signal parts which would include segments such as a synchronizing word, addresses and a status word. A frame counter word would be included to directly identify the position of the particular frame within the series of successive frames. The receiver, after decoding the call signal, can determine from the individual frame counter words how many frames remain to be received until the end of the call signal. By example, if it is ascertained that the fifth from the last frame of a frame series of 32 frames has been received and if thereafter the reception of the next following four last frames is interfered with, it is possible for the receiver to establish that after a time of five frames the end of the call signal has been reached. After waiting for a certain security time beyond the end of the call signal, the acknowledgment signal can be sent out.

For a fully automatic connection establishment, it is especially important that all received words in the call signal are fully evaluated, especially if from these received call signal words the end of the call signal is to be determined exactly. According to a further development in the invention, it has proved advantageous to provide a process to improve the dependability of the recognition of the received bits and the call signal. This process is based upon the results of the soft decision decoding of the receptions, the reception signal strength and the jitter. In addition, according to the invention, there is carried out a weighted addition of the individual bits which correspond to one another in words repeated in successive frames. This process can be used not only in the case of the corresponding bits from the repeated words in successively following frames, for example, the synchronizing word, address word or the like, but may also be used with corresponding special coding of the frame counter word.

After a message connection has been established, further active channel analysis can supplement and improve the results corresponding to the channel qualities stored in the memory. This would also proceed fully automatically.

This invention advantageously provides a system which fully automatically completes a short wave telegraphy signal or other data transfer connection with a low cost system. The system of the invention operates in the establishment of a connection for transmitted telegraphy signals or other data signals but can also be switched after establishment of the connection to other types of modulation, for example, voice radio.

The invention itself, together with further objects and advantages, will best be understood by reference to the following detailed description taken in conjunction with the drawings.

BRIEF DESCRIPTION OF THE DRAWINGS

FIG. 1 is a schematic diagram of one transmitter-receiver station for use in a system of the present invention; and FIG. 2 is a representation of call signals used in the system of the present invention.

DETAILED DESCRIPTION OF THE PREFERRED EMBODIMENTS

FIG. 1 shows the schematic diagram of the apparatus which would be present at two separate stations Nos. 1 and 2. Each station includes a transmitter 3 tunable to various channels of a broad frequency band and a receiver 4 which is also tunable to selected channels of a broad frequency band and which can execute a search in this entire frequency band. A common antenna 5 is switchable between connection with the transmitter 3 and connection with the receiver 4. The receiver 4 includes a demodulator 6 whose output is connected into a testing device 7 which determines the actual quality of the received telegraphy signs. The preferred testing device 7 includes a soft decision measuring device 8, a jitter measuring device 9 and a level measuring device 13. The soft decision measuring device 8 makes a decision as to each received signed bit whether the bit is "high" or "low", "minus 1" or "plus 1", "mark" or "space" and dispenses through its output a confidence value indicating the particular quality or dependability of this yes-no decision. The results of the soft decision measuring device 8 provide the best measure of channel transmission quality. The jitter measuring device 9 also gives information data about the quality of the received signals. The jitter measuring device 9 indicates how strongly the received telegraphy signals are distorted, in other words, how severely they fluctuate. The level measuring device 13 indicates the amplitude or strength of the high frequency signal received on the channel. The information data thus obtained from the testing device 7 about the quality of the received telegraphy signals are stored in a section of a memory 10, hereinafter referred to as channel memory 10, reserved for this channel quality data. Each of the individual devices at each station are controlled by a central processor 12. The central processor 12 is programmed to operate these stations as described in the following details.

Before beginning the establishment of a connection between stations 1 and 2, each receiver 4 executes a search through the entire frequency band and carries out a passive channel analysis as it does so. For each channel, the level measuring device 13 measures the magnitude of the high frequency level received on the channel. This would include the level of the transmission of a foreign as well as the transmitter of its counter station which is received on this channel. It would also include any noise level received. Simultaneously, soft decision 8 and jitter 9 measuring devices evaluate the demodulated output signal of telegraphy signals accidentally received on this channel from foreign sources. A great amount of jitter of a signal accidentally received in this channel, means that this channel is not suited for a connection. The poor quality of the foreign signal received by the channel is recognized. A similar statement can be made for the soft decision decoding. Here as well, on finding qualitatively poor signals, it is perceived that this channel is not suited for transmission.

The bandwidth of a channel is generally about 3 kHz. However, only about 100 Hz is necessary for transmitting telegraphy signals. It would therefore be possible to treat the 100 Hz subchannels as channels and thereby obtain a greater number of channels to choose from and to analyze. By increasing the number of available channels the probability of obtaining the best transmission connection is improved.

In active and passive analysis, besides determining an objective measurement value for the signal quality by using soft decision and jitter after the demodulation, the reception level before demodulation can also be taken into consideration. From this, it is also possible to draw a conclusion as to the channel quality. Thus, for each channel, there is ascertained the momentary transmission quality and the objective measurement values which have been obtained are each stored in the channel memory 10. The channels are arranged in order in a table within channel memory 10 according to their quality. Any one or more of the three tests in the testing device 7 may be used to measure quality. When all three are used, the objective measurement value of the transmission quality at each channel is identified by a single quality number in which the first place corresponds to the soft decision results. The second place corresponds to the jitter results and the third place corresponds to the level measuring results. Thus, soft decision provides the primary determinant of quality and the other results distinguish between channels where the soft decision results are the same.

A fourth test whose results could be used in providing an objective measurement value is determination of the error rate of bits in the received signals. This test could be performed by the central processor 12. The test is performed in a known manner, as is done in telex receivers, for instance.

When a message is to be sent between station 1 and station 2, a start command will be input into the control processor 12 and then the processor 12 will tune the transmitter 3 to the channel which is stored on top of the table within the memory 10. This will be the channel which has registered the best quality. The transmitter 3 then emits for a predetermined time a call signal. The receiver 4 at the receiving station 2 is constantly executing a search over all of the channels and should receive the call signal. The duration of the emission of the call signal is determined according to the time that the receiver 4 at the receiving station 2 needs for a complete search of the entire frequency band. The call signal consists of several successive signal frame sections which each contain a synchronizing word 16. The signal also contains information which establishes the end of the call signal. If the receiver 4 of receiving station 2 actually receives the selected call signal from the transmitter 3 of station 1, then an evaluating program 11 within the central processor 12 at the receiving station 2 operates to determine the end of the call signal.

The transmitter 3 at the receiving station 2 is automatically tuned to the channel on which the call signal was received and an acknowledgment signal is transmitted. At the calling station 1 after the end of the call signal, the processor 12 switches the antenna 5 into connection with the receiver 4 for reception of the selected channel. If this receiver 4 receives the acknowledgment signal with sufficient quality, the normal transmitting-and-receiving operation between stations 1 and 2 can be performed in the known manner. The amount of time for which the receiver 4 at the calling station 1 waits for reception of the acknowledgment signal is determined according to the time it takes for the acknowledgment signal to be transmitted by the receiving station.

If the receiver 4 at the receiving station 2 does not receive the call signal on the channel which is first tried, for example, because momentary poor transmission conditions exist on this channel frequency between stations 1 and 2, then the calling station 1 at the end of its call signal will not receive an acknowledgment signal. The transmitter 3 at calling station 1 will then automatically switch to the next best channel stored in the memory 10. This would be the best channel at which an attempt at establishing a connection was not previously unsuccessful. The calling station 1 will try again to contact receiving station 2 in the same manner as before. The attempt to establish a connection will continue through the third best channel, fourth best channel, etc. until an acknowledgment signal is received.

After a message connection has been established in this manner, an active channel analysis is begun on the selected channel. Each receiver 4 stores the reception level values obtained from the level measuring device 13. These are stored together with the values obtained over the jitter measuring device 9 and the soft decision measuring device 8 in the channel memory 10. These quality values for the transmission of telegraphy signals are stored preferably with the clock time and location data for the particular receiving station for future analysis. In this manner, the objective measurement values of the passive channel analysis are updated. The new values obtained through the active analysis can be averaged into the old values or they may be used to replace the old values. Thereby over a relatively long period of time after the establishment of several different connections between the two stations on different channels by using this active channel analysis the results stored in the memory 10 concerning the quality of the individual channels are slowly improved. At each new call, the stations have available improved results in regards to which is the most favorable channel at that particular moment. Message connections between the two stations can be built up an unlimited number of times fully automatically and in each case on the most favorable channel.

The results available to the stations can be improved even further according to an additional feature of the present invention. The objective measurement values stored at one station can be sent to the other station by including the sorted objective measurement values within the acknowledgment signal. Thus, the objective measurement values stored in memory 10 of calling station 1 can be revised to obtain a more accurate listing of which channels are the best for transmission between the two stations. The revision of the values can be accomplished through averaging the new values into the old values or by replacing the old values with the new values. Carrying this approach a little further, during the transmitting-and-receiving operation between two stations the objective measurement values stored in the channel memories 10 of each station may be exchanged with one another. The optimal sequence for the two stations can then be calculated by the central processor 12 and stored in the channel memory 10 of each station.

When using an active channel analysis, the measurement time is determined according to the type of information being transmitted. If only short burst signals are transmitted, then the measuring time for active channel analysis and the determination of the momentary channel quality is relatively short. For continuous information transmissions, however, a relatively longer measuring time is provided for measuring the mean channel quality.

In a system of the type of this invention, it is important that even under poor transmission conditions the end of the call signal is established with certainty. This is necessary so that the two stations will rapidly and surely be synchronized. Therefore, a call signal as illustrated in FIG. 2 is used. FIG. 2 shows the last three frames 15 of such a call signal composed of thirty-two frames. The length of the call signal is governed according to the time in which it takes the receiver 4 of the receiving station to complete a search run. This assures that for each search run, the receiver 4 can actually search all of the channels and still confirm the reception of a call signal. Each frame 15 consists of a synchronizing word 16, a frame counter word 17, a receiver address 18, a sender address 19 and a status word 20. It would also be possible to include some of the objective measurement values within the call signal. Each word is made up of a number of bits. The synchronizing word 16, the receiver address 18, the sender address 19 and the status word 20 are repeating words. They are alike for each frame 15. The frame counter words 17 differ in successive frames. The frame counter word 17 indicates in which place in the series of frames that the particular frame 15 is located within the call signal. In a call signal consisting of thirty-two frames, the frame counter word 17 of the last frame is, for example, "0", the preceeding one is "1", etc.

The evaluating program 11 in the central processor 12 tests the synchronizing words 16 of a received call signal through a correlation process. By this process the synchronizing word 16 is compared with a reference word to determine whether they are equal or nearly equal. If so, frame synchronization has been achieved. After the frame synchronization, the other words of the frame can be evaluated. If, for example, the third from last frame 15 is evaluted and it is ascertained by the evaluating program 11 that the frame counter word 17 is a "2", then it can automatically be determined by the evaluating program 11 that after two further frames "1" and "0", the end of the call signal is reached. That will be the time when the receiver 4 at the calling station 1 will be switched to reception. Therefore, that is when the acknowledgment signal will be sent from the transmitter 3 at the receiving station 2. Once a frame synchronization is achieved and the actual number of the frame is identified, the call signal can be interfered with without upsetting the exact synchronization between the stations.

In short wave connections, successive bits are often severely interfered with and then seconds later the connection can be substantially better. This is caused from fading phenomena and the like. This could cause synchronization to be delayed or rendered impossible. According to a further development of the invention, further steps are taken to improve the recognition of received call signals. The soft decision data and the jitter data obtained in the testing device 7 are used to contribute to the evaluation of the call signal. According to an especially advantageous further development of the invention, in addition to this information a separate weighted addition process further improves the probability of faultless sign recognition. For this purpose, the soft decision measuring device 8 further provides its output to an additional area in a memory, which we will call the quality memory 21, in which the confidence values of like received bits are summed.

In the quality memory 21, each bit is not simply evaluated as "−1" or "+1", but as a certain negative or positive number. The sign of each number provides the message content, as in a "hard" decision. The absolute value of the number is a measure of the quality. Suppose, that through the soft decision measuring device 8 that for the last three frames 15', 15" and 15''' shown in FIG. 2 the synchronizing word 16 is a four bit word with the following values:

Synchronizing Word Frame 15': +20, +2, −30, −30

Synchronizing Word Frame 15": +30, −30, +30, −30

Synchronizing Word Frame 15''': +10, +1, +10, −30

Correct Synchronizing Word: +, −, +, −

From this it has been determined that in each case the second and third bit of the synchronizing word has been disturbed. Only counting the pluses and minuses determined by a hard decision would yield the bit sequence +, +, +, −, which would be wrong. By adding up the successively found values, however, there is yielded +60, −27, +10, −90. From this, the correct message can be perceived. In this manner, the weighted addition of the successive bit values into the quality memory 21, substantially improves the probability of a correct sign recognition.

The weighted addition is applicable only to the repeating words, those being the synchronizing word 16, the receiver address 18, the sender address 19 and the status word 20. Suitable modifications may be made so that the weighted addition method can be used for the unlike sign sections as well. A suitable coding of the unlike sign sections needs to be made so that the successive sections can be easily made equal. It is merely necessary to choose for the differing sign words a code which permits determination from a given arbitrary counter state, the previous and successive counter state, without it being necessary to know the actual value of the counter state. In other words, the preceding and following word should be determinable by a predefined process of some combination of incrementing, decrementing and/or shifting. A simple example is the so called shift code with the following properties:

| | |
|---|---|
| 4 | 00001 |
| 3 | 00010 |
| 2 | 00100 |
| 1 | 01000 |
| 0 | 10000 |

In this code, successive binary numbers are either raised or lowered by one place in order to achieve equality with the preceding or following number. If the frame counter words 17 are coded according to this shift code, then application of this shifting principle in successive frames can establish bit equality in each frame. After which the weighted addition can be applied for improvement of the sign recognition. To accomplish this, the evaluating program 11 feeds successive frame counter words 17 into the quality memory 21 shifted by one so that the individual values can be added up in their storage places. In the equalizing of the frame counter word 17, the number of necessary shifts should be directly equivalent to the number of frames received. Therefore, the weighted addition method can be used on all the bit words of each frame to improve the sign recognition for the total content of the frames.

Of course, it should be understood that various changes and modifications to the preferred embodiments described above will be apparent to those skilled in the art. It is therefore intended that such changes and modifications be covered by the following claims.

We claim:

1. A system for establishing a shortwave telegraphy connection between two transmitter-receiver stations on one of a plurality of channels, comprising:

each transmitter-receiver station including a transmitter, a receiver and an antenna, switchable between the transmitter and the receiver for selectively adapting the station to be either a calling station or a receiving station;

each receiver having means to search all of said channels prior to establishing a shortwave telegraphy connection;

testing means at each said station for measuring and evaluating signals received by the receiver of the respective station on each channel to determine objective measurement values of the quality of the signal transmission on each channel, said testing means including means to perform a passive channel analysis on each channel before a shortwave telegraphy connection is established between the two stations including at least measuring and evaluating the strength and jitter of the received signals;

said testing means further including means for performing active channel analysis on the data being transmitted on a particular channel after a shortwave telegraphy connection is established between the two stations on that channel to obtain additional objective measurement values of the signal transmission quality on that channel;

a memory at each said station for storing the objective measurement values as to each channel obtained from said testing means at the respective station of said memory; and processor means at each station interfaced to said transmitter and receiver, said testing means, and said memory, for controlling the operation of each representative station and for automatically establishing a telegraphy connection between a calling station and a receiving station, said processor means at said calling station comprising means for directing the transmitter of said calling station to transmit a call signal over the channel having the best objective measurement value stored in said memory of said calling station, said processor means at said receiving station comprising means for directing the transmitter of said receiving station to send an acknowledgment signal over the channel of the call signal after receipt of said call signal, and said processor means at said calling station further comprising means for directing the transmitter of said calling station to transmit signals comprised of a succession of bits over the channel of the call signal thereby establishing said telegraphy connection, if the acknowledgment signal is received, and means for directing the transmitter of said calling station to transmit a call signal over a next selected one of said channels if the acknowledgment signal is not received within a predetermined time after the call signal is transmitted;

said processor means at each said station further comprising means to replace the objective measurement values stored in said memory for the channel on which a telegraphy connection has been established, with said additional objective measurement values determined by said testing means through active channel analysis.

2. The system of claim 1 wherein each of said testing means comprises soft decision measuring means for evaluating signals received by the receiver at the station of said testing means.

3. The system of claim 1 wherein each of said testing means comprises means for determining the error rate of bits within signals received by the receiver at the station of said processor means.

4. The system of claim 1 wherein the acknowledgment signal includes a plurality of the objective measurement values from said memory at said receiving station.

5. The system of claim 1 wherein said processor means at said calling station further comprises means to direct said transmitter at said calling station to transmit the objective measurement values stored in said memory of said calling station to said receiving station, and wherein said processor means at said receiving station further comprises means to direct said transmitter at said receiving station to transmit the objective measurement values stored in said memory of said receiving station to said calling station, when said telegraphy connection has been established, and wherein said processor means at each station further comprises means to calculate an optimal sequence of channels for the best transmission between both stations, and means to store said optimal sequence in said memories at each station.

6. The system of claim 1 wherein the call signal includes a plurality of the objective measurement values stored in said memory at said calling station.

7. The system of claim 1 wherein the call signal comprises a series of signal frames, each frame comprising a frame counter word having a sequence of bits to indicate the position of the particular frame within the frame series and a plurality of repeating words, each having a sequence of bits which is repeated in each of the signal frames.

8. The system of claim 7 wherein said processor means at said receiving station includes means for evaluating the frame counter word in the call signal to determine the end of the call signal and means responsive to said evaluating means for switching the antenna of said receiving station into connection with the transmitter of said receiving station at the end of the call signal.

9. The system of claim 8 wherein the repeating words of each frame of the call signal include a synchronizing word, a sender address, and a receiver address.

10. The system of claim 9, wherein said testing means at said receiving station comprises soft decision measuring means for determining confidence values for the bits in received signals.

11. The system of claim 10 wherein said processor means at said receiving station further comprises correlation means for synchronizing the receiver at said receiving station with the synchronizing word in the call signal.

12. The system of claim 10 wherein said processor means at the receiving station further comprises means for summing the confidence values of corresponding bits of the repeating words in successive frames of the call signal.

13. The system of claim 10 wherein the frame counter word is coded so that from any frame counter word the preceding and following frame counter word is determinable through a predefined process of incrementing, decrementing or shifting.

14. The system of claim 1 wherein said processor means at said calling station further comprises means to direct the transmitter at said calling station to transmit the objective measurement values stored in said memory at said calling station to said receiving station as part of the call signal, and wherein said processor at said receiving station further comprises means to update the objective measurement values stored in the memory at said receiving station upon receipt of said call signal by averaging them with the objective measurement values received with said call signal.

15. A method for automatically establishing at a calling station a shortwave telegraphy connection between the calling station and a receiving station on one of a plurality of channels comprising:
(a) searching through the channels with a receiver;
(b) performing a passive channel analysis on each channel, said analysis consisting at least of measuring the strength and jitter of the digital signals received by the receiver on each channel to produce objective measurement values for each channel;
(c) storing the objective measurement values in a memory;
(d) tuning a transmitter to the channel having the best objective measurement value;
(e) sending a call signal through the transmitter over the channel to which it is tuned;
(f) waiting a predetermined amount of time for an acknowledgment signal from the receiving station on the channel used for sending the cell signal and if no signal is received, tuning the transmitter to a next selected one of said channels and performing steps (e) and (f) until an acknowledgment signal is received;
(g) commencing message transmitting-and-receiving after receiving an acknowledgment signal over the channel used by the call signal and the acknowledgment signal;
(h) performing an active channel analysis on the channel on which message transmitting-and-receiving has been established, said active channel analysis consisting of at least measuring the strength and jitter of the digital signals on said channel to determine additional objective measurement values of the transmission quality of said channel; and
(i) replacing the objective measurement values obtained by passive channel analysis and stored in said memory with the additional objective measurement values obtained by active channel analysis.

16. The method of claim 15 wherein said passive channel analysis includes soft decision measuring of the bits in the received signals.

17. The method of claim 15 wherein said passive channel analysis includes determining the error rate of bits in the received signals.

18. The method of claim 15 wherein the acknowledgment signal includes objective measurement values for each channel stored in said memory at the receiving station.

19. The method of claim 18 further comprising:
updating the objective measurement values stored in the memory by averaging them with the objective measurement values received in the acknowledgment signal.

20. The method of claim 15 wherein the call signal comprises a series of signal frames, each frame comprising a frame counter word indicating the position of the particular frame within the frame series.

21. The method of claim 20 wherein each frame of the call signal further comprises a synchronizing word, a sender address and a receiver address.

22. The method of claim 20 wherein each frame of the call signal further comprises a plurality of the objective measurement values stored in said memory at said calling station.

23. A method for automatically establishing a shortwave telegraphy connecting at a receiving station with a calling station on one of a plurality of channels comprising:
(a) searching through the channels with a receiver;
(b) performing a passive channel analysis on each channel, said analysis consisting at least of measuring the strength and jitter of the digital signals received by the receiver on each channel to produce objective measurement values for each channel;
(c) storing the objective measurement values in a memory;

(d) evaluating the signal received on each channel to determine if it is a call signal;

(e) if the received signal is a call signal, determining the end of the call signal;

(f) switching an antenna from connection with the receiver into connection with a transmitter after the end of the call signal; and (g) sending an acknowledgment signal over the channel on which the call signal was received;

(h) receiving data signals from said calling station on the channel on which said call signal was received;

(i) performing an active channel analysis on the channel on which said data signals are received, said active channel analysis including at least measuring the strength and jitter of the data signals received to determine additional objective measurement values of the transmission quality of that channel; and (j) replacing the objective measurement values stored in memory for the channel on which the data signals are being received with the additional objective measurement values for that channel determined by said active channel analysis.

24. The method of claim 33 wherein the acknowledgment signal includes the objective measurement values for each channel stored in said memory at said receiving station.

25. The method of claim 23 wherein said passive channel analysis includes determining the error rate of bits in the received signals.

26. The method of claim 23 wherein said passive channel analysis includes soft decision measuring of a confidence value for the bits in received signals.

27. The method of claim 26 wherein the call signal comprises a series of signal frames, each frame comprising a frame counter word having a sequence of bits to indicate the position of the particular frame within the series of frames and a plurality of repeating words, each having a sequence of bits which is repeated in each of the signal frames.

28. The method of claim 27 wherein the end of the call signal is determined by evaluating the frame counter word.

29. The method of claim 27 wherein the repeating words of each frame of the call signal include a synchronizing word.

30. The method of claim 29 further comprising summing the confidence values of corresponding bits of the repeating words in successive frames of the call signal.

31. The method of claim 30 further comprising:
synchronizing the receiver with the synchronizing word of the call signal.

32. THe method of claim 27 wherein the frame counter word is coded so that from any frame counter word the preceding and following frame counter word is determinable through a predefined process of incrementing, decrementing or shifting.

33. The method of claim 23 wherein the call signal includes the objective measurement values for each channel stored in memory at said calling station.

34. The method of claim 33 further comprising:
updating the objective measurement values stored in memory at said receiving station by averaging them with said objective measurement values received with said call signal.

* * * * *

UNITED STATES PATENT AND TRADEMARK OFFICE
CERTIFICATE OF CORRECTION

PATENT NO. : 4,555,806

DATED : November 26, 1985

INVENTOR(S) : Wolf-Ruediger Lange, et al.

It is certified that error appears in the above-identified patent and that said Letters Patent is hereby corrected as shown below:

Column 10, line 17, delete "representative" and insert therefor --respective--.

Column 12, line 7, delete "cell" and insert therefor --call--.

Column 12, line 57, delete "connecting" and insert therefor --connection--.

Column 13, line 24, delete "33" and insert therefor --23--.

Column 14, line 20, delete "THe" and insert therefor --The--.

Signed and Sealed this

Seventeenth Day of March, 1987

*Attest:*

DONALD J. QUIGG

*Attesting Officer*  *Commissioner of Patents and Trademarks*